O. S. SELLS.
VEGETABLE WASHER.
APPLICATION FILED AUG. 13, 1919.

1,381,510.

Patented June 14, 1921.
2 SHEETS—SHEET 1.

Inventor
Ogden S. Sells
by Geyer & Popp
Attorneys.

O. S. SELLS.
VEGETABLE WASHER.
APPLICATION FILED AUG. 13, 1919.

1,381,510.

Patented June 14, 1921.
2 SHEETS—SHEET 2.

Inventor
Ogden S. Sells
by Geyer & Popp
Attorneys.

UNITED STATES PATENT OFFICE.

OGDEN S. SELLS, OF BUFFALO, NEW YORK, ASSIGNOR TO PEERLESS HUSKER COMPANY, OF BUFFALO, NEW YORK, A COPARTNERSHIP.

VEGETABLE-WASHER.

1,381,510.      Specification of Letters Patent.      Patented June 14, 1921.

Application filed August 13, 1919. Serial No. 317,137.

*To all whom it may concern:*

Be it known that I, OGDEN S. SELLS, a citizen of the United States, residing in Buffalo, in the county of Erie and State of New York, have invented new and useful Improvements in Vegetable-Washers, of which the following is a specification.

This invention relates to a machine for removing objectionable material from vegetables or other food products and is more particularly adapted for removing dirt and corn silk from husked ears of corn.

One of the objects of the invention is to produce a reliable and simple washer for vegetables and the like that may be run continuously without clogging up. A further object of the invention is to present all portions of the vegetables to a spray of water and also to mechanically dislodge all the fine particles of embedded or adhering dirt and to strip off all small stems, corn silk and other integral growths from the vegetables which are passed through the washer.

Figure 1:
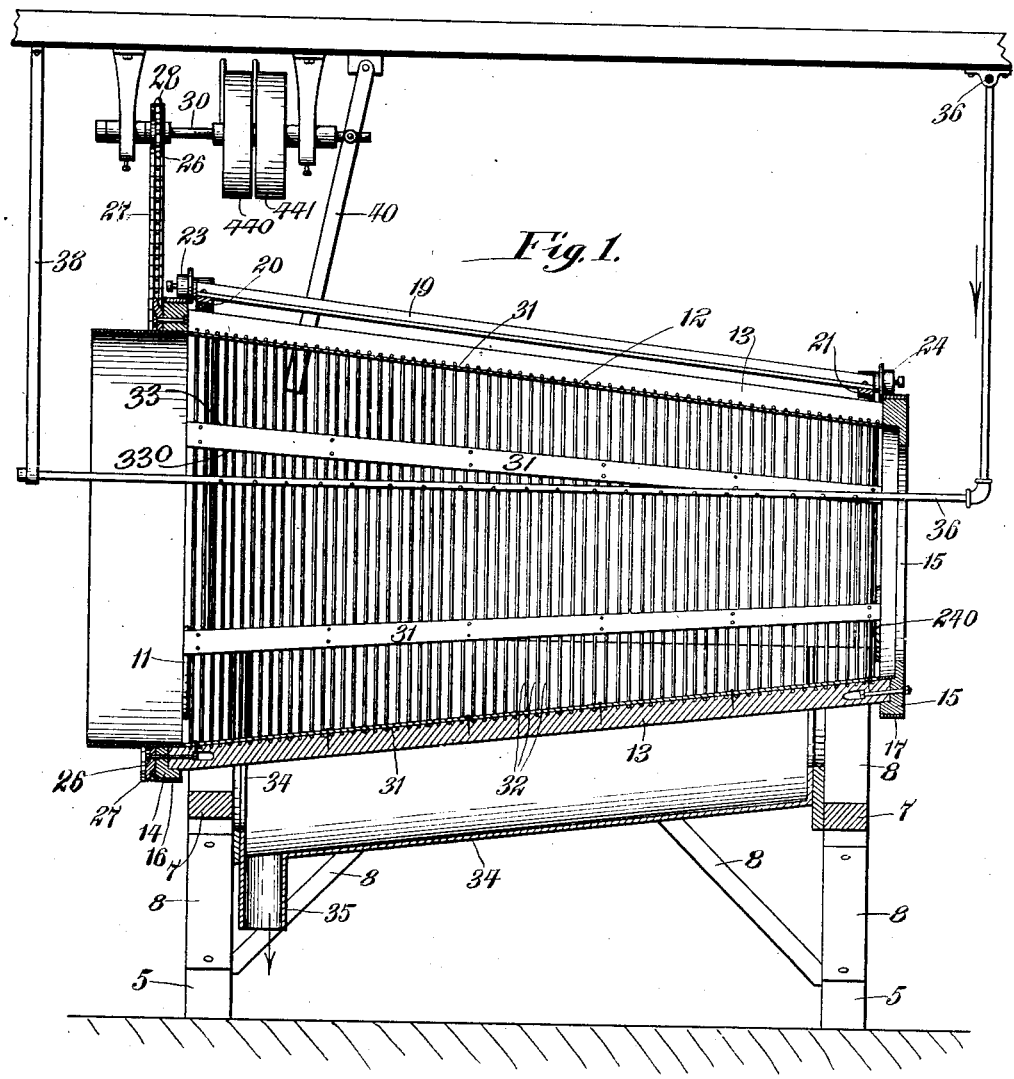
Figure 2:
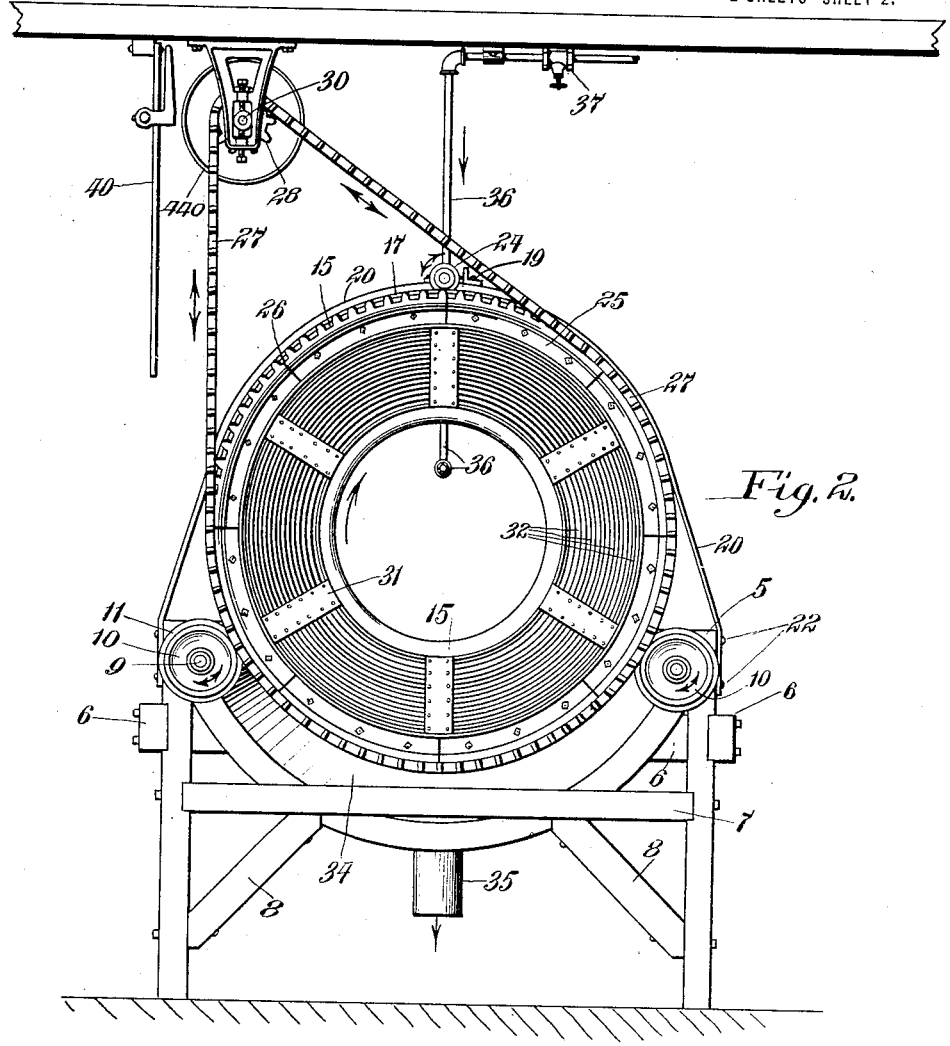
Figure 3:
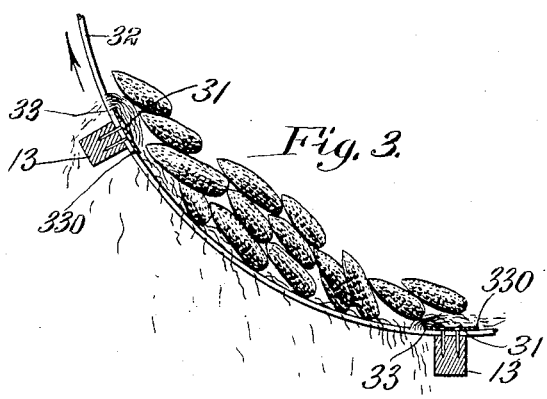

In the accompanying drawings:

Figure 1 is a vertical longitudinal section through the washing machine. Fig. 2 is a rear end elevation thereof, partly in section. Fig. 3 is a fragmentary sectional view showing the means whereby small material is prevented from clogging the orifices of the washer.

Similar characters of reference refer to like parts throughout the several views.

The general mechanical construction of this improved vegetable washer may be of various forms but that shown in the drawings is preferred and is as follows:

5 represents four upright frame legs or pillars which are longitudinally connected together by means of frames 6 which are suitably secured to the upper parts of said legs on the outer sides thereof and are arranged longitudinally on each side of the vegetable washer. The legs 5 are transversely connected together by means of beams 7 which are arranged transversely at either end of the washer. The legs are preferably braced or stiffened by suitable angular stays 8 which secure the same to adjacent longitudinal and transverse beams. These beams, legs and braces together constitute the main frame of the machine. Journaled on suitable longitudinal studs 9 located on both sides of the frame on the front end thereof are front supporting wheels 10 which are preferably provided with laterally extending annular flanges 11 at their inward sides. The rear end of the washer is also provided with rear supporting wheels 240 which are similar to said front supporting wheels 10.

Carried by said supporting wheels and adapted to rotate about a longitudinal axis thereon is a hollow conical screen or sieve 12 forming a drum. This screen comprises a plurality of longitudinal supporting bars 13 which converge rearwardly toward each other and are connected together at their opposite longitudinal ends by front and rear heads or rings 14 and 15 respectively which lie in planes transverse to the axis of the screen and are concentric therewith. Preferably arranged around the outer annular faces of said heads and suitably secured thereto are front and rear guide or wearing tracks 16 and 17 respectively. The treads of the supporting wheels 10, 240 are arranged to bear on the outer annular faces of said guide tracks and longitudinal displacement of the screen is prevented by reason of the flanges of said supporting wheels, which flanges are arranged to bear against the inner faces of said guide tracks 16 and 17. The supporting wheels are so positioned that they act not only as rolling supports for the screen but also act as centering guides therefor, each supporting wheel preventing the screen from being displaced horizontally as well as supporting said screen by reason of the fact that said supporting wheels are positioned considerably above the lowermost parts of their respective guide tracks 16 and 17 but below the axis of the screen 12. This construction eliminates the necessity of positioning any rotating parts near the lowermost parts of the screen, where otherwise they would be subjected to cloggage from material dropping from the screen.

Passing around the upper part of the screen 12 at its front and rear ends respectively are front and rear supporting arches 20 and 21 whose lower ends are suitably secured by screws 22 to the legs of the frame. Preferably the two arches are mutually stiffened longitudinally or connected to each other by means of a longitudinal stringer 19. Journaled in suitable bearings on the uppermost portions of said arches are front and rear retaining wheels 23 and 24 respectively, which wheels are arranged to bear with their treads against the outer surface of their respective guide tracks and are preferably also provided with suitable annular flanges on their inner sides which bear against the inner faces of the guide tracks.

The whole screen 12 may be rotated in the frame by means of any suitable power transmission but it is preferred that the arrangement be such that the screen may be rotated in either direction as desired. In the construction shown in the drawings a plurality of separate arcuate segments 25 making up a sprocket wheel 26 are secured to the front face of the front screen head 14. Passing with its lower turn about said sprocket wheel 26 is a chain belt 27, whose upper turn passes around a driving sprocket pinion 28 secured to a counter shaft 30, so that by rotating this shaft in one direction or the other, the screen 12 is caused to rotate in either desired direction.

Secured against the inner face of each longitudinal bar 13 is a longitudinal cutter 31 which is preferably constructed of a comparatively thin sheet metal plate or strip and is greater in width than its companion bar 13 and extends laterally for a small distance beyond either side thereof. Held firmly between the cutters 31 and the supporting bars 13 are a plurality of circumferential separating rings, hoops or ribs 32 which are arranged in a longitudinal row and coaxial with the screen 12 and preferably constructed of wire. These separating rings 32 decrease in diameter from the front end toward the rear end of the machine so as to conform to the convergence of the longitudinal bars 13 and each is separated from the ring next adjacent by a comparatively small gap.

The vegetables which are to be washed in this improved washer, such for instance as husked corn, are fed into the rear or smaller end of the screen 12. The screen meanwhile is rotated at some constant speed from the counter shaft 30, but the peripheral velocity of the screen is less at its rear end than at its front end so that the longitudinal movement of the vegetables is one of constantly accelerated motion, whereby all clogging or piling up of vegetables in the machine is eliminated. The horizontal inclination of the bottom of the screen 12 is of course uniform, the accelerated motion of the vegetables being due to the fact that at the higher peripheral velocities, each vegetable is jostled or bounced around much more rapidly which gives a greater opportunity for gravity to move the same down the incline toward the front of the machine. As shown in Fig. 3, the longitudinal cutters 31 which hold the separating rings 32 in place, are constructed so as to be self cleaning by reason of their thinness and the fact that they project out transversely beyond the sides of the longitudinal bars 13, which projecting portions form cutting edges 33. Any tenacious debris, such as corn silk or vegetable stems is restrained against moving in the direction of rotation of the screen by the mass of material which causes the advancing cutting edges 33 of the cutters to sever the corn silk or other similar matter and permit the same to drop into a suitable receptacle 34 which is suitably secured to the main frame below the screen 12 and which is preferably provided with a discharge pipe 35 for delivering its contents. It should be noted that said cutting edges 33 are not only self cleaning by reason of their severing action upon impinging material but that they also serve to strip off objectionable protruding matter such as corn silk, stems, etc., directly from the vegetables, as the same are constantly tumbling down at right angles to said cutting edges of the plates 31. While this cleaning and scrubbing or tearing off action is going on, it is preferred that the vegetables passing through the machine, be subjected to a spray of water from a suitable spray pipe 36 which is controlled by a valve 37 and is supported at its forward end by a strap hanger 38. Occasionally the cutting edges 33 may become clogged after prolonged use of the washer and for this reason the other side also of each cutter plate projects circumferentially beyond the edge of its companion longitudinal bar 13 and is also provided with a cutting edge 330. Thus when the screen is rotated in the opposite direction, the cutting edges 330 which are now acting to cut away any accumulating material will operate the same as in the case of the aforesaid edges 33. And in the meantime said other edges 33 will be released of any material which may have been packed against them by reason of the frictional action of the vegetables themselves, which vegetables under these circumstances, are moving in a peripheral direction which is away from said cutting edges 33, thereby frictionally pulling away accumulated debris from said cutting edges. In actual practice, it is not found necessary to give a specially sharpened knife edge to these cutting edges 33 and 330, the substantially sharp edge which is present on the thin sheet metal employed for the cutters being quite ample for the purpose, without necessitating any sharpening of the same.

In operation, the lever 40 which controls the belt on the pulleys 440, 441 is moved so as to rotate the screen 12 and the control valve 37 is turned on so as to allow the water to spray from the spray pipe 36. Then the vegetables to be cleaned are fed continuously into the rear or narrow end of said screen 12, the vegetables moving forwardly toward the larger end of the same with a constantly accelerated speed and finally dropping out upon any suitable conveyer which may be employed for this purpose in coöperation with the washer. All particles of dirt, detached kernels, stems, corn silk, fine growths, etc., drop through the spaces between the rings 32 and into the receptacle 34 together with the descending sprayed water, and the same are removed through the discharge pipe 35. If ever the longitudinal cutters 31 should become clogged, it is merely necessary to reverse the direction of rotation of the screen 12. Ordinarily, however, the thin lateral edges of these cutters will cut off any material with which they come in contact, by reason of the frictional circumferential rubbing of the vegetables against said material, which material is thereby forced back against the cutting edges of the cutters and severed. Furthermore, both the protruding bodies of the cutters and also their cutting edges act to strip, rub and tear off all loose objectionable material from the vegetables, such as corn silk, partly decayed kernels, stems, etc.

The washer is very thorough in its cleaning action. It is applicable for removing objectionable matter from many kinds of vegetables, fruits, roots, herbs, etc. It operates substantially as a self cleaner and is absolutely self cleaning if the screen is occasionally reversed in rotation. It is simple and strong in construction and not liable to get out of order. Furthermore, the constantly increased acceleration given the vegetables as they pass through the machine prevents any liability of having the vegetables accumulate in one part and either clog or stop the washer and the feeding mechanism therefor and also prevents incidentally, the grinding of an accumulated mass of valuable vegetables to a worthless pulp, as would otherwise occur should the flow of vegetables through the machine be arrested. Finally the washer requires little power for its operation and is low in manufacturing cost.

I claim as my invention:

1. A vegetable washer comprising a rotatable conical screen, and a longitudinal cutter arranged within the screen adjacent to the inner surface thereof and adapted to sever particles caught thereon.

2. A vegetable washer comprising a rotatable conical screen, a longitudinal plate arranged within the screen adjacent to the inner side thereof and provided with a cutting edge.

3. A vegetable washer comprising a rotatable conical screen, having a plurality of longitudinal bars arranged in an annular row and a plurality of annular separating rings connected with said bars, and longitudinal cutter plates mounted lengthwise on the inner side of said screen and each projecting laterally beyond opposite sides of one of said longitudinal bars and provided with longitudinal cutting edges.

4. A vegetable washer comprising a rotatable tapering screen having a plurality of circumferential separating rings arranged side by side lengthwise of the screen and spaced apart and longitudinal cutter plates arranged on the inner side of said rings.

5. A vegetable washer comprising a hollow tapered screen provided with interspaced circumferential separating rings and longitudinal cutter plates arranged on the inner sides of said ring and a spraying pipe arranged inside of said screen and adapted to spray a cleansing liquid against the inner part of said screen.

6. A vegetable washer comprising a rotatable screen having a longitudinal bar, a longitudinal cutter secured to said bar and extending transversely on either side of said bar so as to form cutting edges on either side thereof, and means for turning said screen in one direction or the other.

7. A vegetable washer comprising a tapering rotatable screen having longitudinal supporting bars and circumferential separating rings secured to said bars, cutter plates arranged on the inner side of said screen in line with said bars, means for spraying the matter to be cleaned with a cleansing liquid, annular guide tracks secured to opposite ends of said screen, supporting wheels engaging with said guide tracks and arranged below and on either side of the axis of rotation of the screen, retaining wheels also arranged to engage with said guide tracks and positioned above the axis of rotation of the screen, and means for rotating the screen in either direction.

OGDEN S. SELLS.